United States Patent
Ma

(10) Patent No.: US 7,324,435 B2
(45) Date of Patent: Jan. 29, 2008

(54) METHODS AND APPARATUS FOR RECEIVING OFDM SIGNALS

(75) Inventor: Yugang Ma, Singapore (SG)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 10/405,519

(22) Filed: Apr. 2, 2003

(65) Prior Publication Data

US 2004/0037218 A1    Feb. 26, 2004

(30) Foreign Application Priority Data

Apr. 3, 2002   (SG) ............................ 200202012
Jul. 26, 2002  (SG) ............................ 200204550

(51) Int. Cl.
*H04J 11/00*    (2006.01)
(52) U.S. Cl. .................. 370/208; 370/210; 370/350; 370/503
(58) Field of Classification Search .................. None
See application file for complete search history.

(56) References Cited

U.S. PATENT DOCUMENTS

| | | | |
|---|---|---|---|
| 6,876,675 B1* | 4/2005 | Jones et al. ................. | 370/509 |
| 2001/0015988 A1 | 8/2001 | Sawada et al. | |
| 2002/0126618 A1* | 9/2002 | Kim ........................... | 370/208 |
| 2002/0145971 A1* | 10/2002 | Cho et al. .................. | 370/208 |
| 2003/0081633 A1* | 5/2003 | Ben-Eli et al. ............. | 370/503 |

FOREIGN PATENT DOCUMENTS

| | | |
|---|---|---|
| EP | 1 126 673 | 8/2001 |
| EP | 1 185 048 | 3/2002 |
| WO | WO 01 91393 | 11/2001 |

OTHER PUBLICATIONS

Hui Liu, et al., "A High-Efficiency Carrier Estimator for OFDM Communications", IEEE Communications Letters, vol. 2, No. 4, Apr. 1998, pp. 104-106.

(Continued)

*Primary Examiner*—Chau Nguyen
*Assistant Examiner*—Kenneth R Hartmann
(74) *Attorney, Agent, or Firm*—Frommer Lawrence & Haug LLP; William S. Frommer

(57) ABSTRACT

A receiver for OFDM signals estimates the carrier frequency offset from a training sequence of symbols in the received signal, by minimising a cost function which is designed to exploit statistically the information in the symbols. In a first firm, the cost function includes terms generated from the received signal at pairs of symbols which are not just nearest-neighbours in the symbol sequence. For example, the cost function may include not just terms generated between nearest neighbour symbols, but between all pairs of symbols. In a second form, the cost function includes terms which describe the relationship between the corresponding elements within different symbols. Thus, the invention makes it possible to obtain much more statistics than in conventional methods from the same training sequence. This can increase signal-to-noise ratio (SNR) as compared to prior art systems. Accordingly, a more accurate estimate of carrier frequency offset can be achieved.

19 Claims, 4 Drawing Sheets

OTHER PUBLICATIONS

Ufuk Tureli, et al., "OFDM Blind Carrier Offset Estimator: ESPRIT", IEEE Transactions on Communications, vol. 48, No. 9, Sep. 2000, pp. 1459-1461.

Jian Li, et al., "Carrier Frequency Offset Estimation for OFDM-Based WLANs", IEEE Signal Processing Letters, vol. 8, No. 3, Mar. 2001, pp. 80-82.

Robert W. Heath, Jr., et al., "Exploiting Input Cyclostationarity for Blind Channel Identification in OFDM Systems", IEEE Transactions on Signal Processing vol. 47, No. 3, Mar. 1999, pp. 848-856.

Jian Li et al., "An Efficient Algorithm for Time Delay Estimation", IEEE Transactions on Signal Processing, vol. 46, No. 8, Aug. 1998, pp. 2231-2235.

* cited by examiner

METHODS AND APPARATUS FOR RECEIVING OFDM SIGNALS

FIELD OF THE INVENTION

This invention relates to a receiver for-Orthogonal Frequency Division Multiplexing (OFDM) signals, such as one for use in cellular wireless communication systems or wireless local area loops (WLAN). In particular, it relates to receivers employing novel methods for carrier frequency offset over multipath fading channels. It further relates to those methods, and to communication systems including the receivers.

BACKGROUND OF THE INVENTION

Orthogonal Frequency Division Multiplexing (OFDM) is a promising transmission technology for very high-speed information transfer. It is already used in digital television broadcasts (DTVB) and wireless local area networks (WLAN). OFDM has also been proposed for fourth generation (4G) wireless communication systems and wireless asymmetric transport mode (wireless ATM).

A model of some components of a known OFDM communication system is shown in FIG. 1. FIG. 1(a) shows the structure of an OFDM transmitter. Input data S(n) (where n is an integer variable having a respective value for each symbol) to be transmitted is input (from the left of FIG. 1(a)) to a serial to parallel converter 1 to generate M parallel signals $S_1(n), \ldots, S_k, \ldots, S_M(n)$, where the variable k in the range 1 to M labels the M elements of the n-th symbol. These signals are passed to an M-point Inverse Discrete Fourier transform (IDFT) 3. The output f(n) is transmitted to a unit 7 which adds a cyclic prefix. The result is then passed to a transmission unit 9 (e.g. a radio transmission unit in the case that the signal is to be transmitted by radio). FIG. 1(b) shows schematically how the transmitted signal (input from the left of FIG. 1(b)) is subject to a multipath channel, and to added noise. The result is received by a receiver (not shown in FIG. 1) as a serial signal y(n).

The receiver uses a serial parallel converter to remove any cyclic prefix and convert the received signal y(n) to M parallel signals $y_1(n), \ldots, y_k(n), \ldots, y_M(n)$, which we also refer to here as y(n). It then subjects the result to an M-point discrete Fourier transform (DFT), and then performs channel equalisation using an equaliser.

According to the principle of OFDM, the multipath channel can be modelled as M flat-fading channels in the frequency-domain after the DFT. Therefore the equaliser can equalize the equivalent channels, assuming that it knows the properties of the channel (here called "channel parameters"). The cyclic prefix can handle the cyclic convolution effect when the signal passes through a frequency-selective multi-path channel.

The receiver conventionally includes two independent units for respectively estimating the "carrier frequency offset" and the channel parameters. The carrier frequency offset means the frequency difference between the Inverse Discrete Fourier Transform (IDFT) in the transmitter and the Discrete Fourier Transform (DFT) in the receiver. It has respective values for all M carriers, but all depend on a single carrier frequency offset value $\phi$. The carrier frequency offset is caused by the Doppler shift during signal transmission and the different oscillators in the transmitter and receiver. The carrier frequency offset estimation provides difference information which is input to the DFT so that the errors can be removed during the DFT process.

The channel estimator is responsible for estimating the channel parameters and providing the information to the equalizer.

We now introduce a mathematical representation of the process in the receiver.

The received signal $y(n) \in C^{M \times 1}$ can be denoted as $$y(n) = EWH\underline{s}(n)e^{j\phi(n-1)(M+N_C)} + \underline{\xi}(n) \quad (1)$$

where $$E = \text{diag}[1, e^{j\phi}, \ldots, e^{j(M-1)\phi}] \in C^{M \times M} \quad (2)$$

is the carrier frequency offset matrix and $\phi$ is the carrier frequency offset. The term diag[ ] means a diagonal matrix having as its entries the elements of the vector in the square bracket. $N_c$ is the length of cyclic prefix. W is the IDFT matrix. Each of its elements, corresponding to the lth row and m th column, is given by $e^{-j2\pi ml/M}$.

$$H = \text{diag}[h(0), \ldots, h(M-1)]$$

is the flat-fading channel parameter matrix, $\underline{s}(n)$ is a data transmitted in block n (i.e. the nth Serial-to-Parallel converting), and $\underline{\xi}(n) \in C^{M \times 1}$ is an additive Gaussian noise vector.

The function of the carrier frequency offset estimation is thus to estimate E, so that its effects can be removed. Similarly, the function of the channel estimation is to estimate H, so that its effects can be removed. The estimations are performed based on received signals including a plurality of known training OFDM symbols (a "training sequence").

In some systems, for example WLAN systems, the training sequence is a series of identical OFDM symbols. In this case, the received signal in respect of each symbol can be treated as a "sample" from the same distribution. [6] proposed a carrier frequency offset estimation using a non-linear least-square (NLS) technique, based on a cost function which is a sum over each of the training symbols (except the last) of a function of (i) the received signal for that training symbol and (ii) the received signal for the consecutively next training symbol. In other words, the cost function is generated based on relationships between "nearest neighbours" in the series of training symbols. In this way, one can estimate carrier frequency offset by N−1 statistics, where N is the number of OFDM block symbols used for the training. Moreover, the technique did not consider the relationship between the elements of the OFDM symbols.

SUMMARY OF THE INVENTION

The present invention aims to provide new and useful methods for OFDM carrier frequency offset and channel parameter estimations, and new and useful OFDM receivers.

The present invention has two aspects united by the common concept of varying the cost function used to determine the carrier frequency offset so as to make statistically improved use of the received symbols, and thus to improve the accuracy with which the carrier frequency offset can be estimated.

In general terms, the present invention proposes in a first aspect that the carrier frequency offset is estimated using a cost function which includes terms generated from the received signal at a (predetermined) set of pairs of samples which are not just nearest-neighbours in the symbols sequence. For example, the cost function can include terms generated not only between the nearest neighbour symbols, but also between all pairs of symbols.

Thus, the invention makes it possible to obtain many more statistics than in conventional methods from the same number of observation samples. This can increase signal-to-noise ratio (SNR) as compared to prior art systems. Accordingly, more accurate estimate of carrier frequency offset can be achieved.

This method is suitable when the training sequence is a series of identical OFDM symbols.

The present invention is especially valuable for a burst packet switch communications system such as a WLAN system, because the number of training symbols available for estimation in this kind of communication systems is very small. Using the limited samples efficiently is very important to achieve a good performance.

Specifically, a first expression of the first aspect of the invention is a method, for use in an OFDM receiver, of estimating a carrier frequency offset value, the method including:

receiving an OFDM signal including a received signal for each of a series of N symbols;

deriving a cost function which is a sum, over a set of pairs of said symbols, of a correlation function of (i) a carrier frequency offset value, and (ii) the received signals for that pair of symbols;

determining the carrier frequency offset value as a stationary point of the cost function;

wherein said pairs of symbols comprise pairs of symbols which are not consecutive within said series.

An alternative expression of the first aspect of the invention is an OFDM receiver including:

a first portion for receiving OFDM signals and generating reconstructed messages, the first portion being arranged to employ carrier frequency offset values and one or more channel parameters;

a second portion for estimating carrier frequency offset values and one or more transmission channel parameters from received OFDM signals, the second portion including:

a carrier frequency offset estimation unit arranged to receive the signals and to estimate the carrier frequency offset, and a channel parameters estimation unit;

the carrier frequency offset estimation unit being arranged to estimate the carrier offset upon receiving a training sequence of N symbols by:

deriving a cost function which is a sum, over a set of pairs of said symbols, of a correlation function of (i) a carrier frequency offset value, and (ii) the received signals for that pair of symbols;

determining the carrier frequency offset value as a stationary point of the cost function;

wherein said pairs of symbols comprise pairs of symbols which are not consecutive within said series.

In a second aspect, the invention proposes in general terms that the carrier frequency offset is estimated by (i) for each value of k (i.e. for each of the M elements of which the N symbols are composed) using the N values $y_k(n)$ to derive a respective relative energy $p(k)$, and (ii) deriving the carrier frequency offset using a cost function which is a sum over terms in which the elements $y_k(n)$ of each symbol are weighted using the respective relative energy $p(k)$. Each relative energy $p(k)$ may be defined as an average over the N symbols (or more generally over some or all of the N symbols) of a function of $y_k(n)$.

Specifically, a first expression of the second aspect of the invention is a method, for use in an OFDM receiver, of estimating a carrier frequency offset value, the method including:

receiving an OFDM signal $y_k(n)$ composed of N symbols labelled by an integer n=1, . . . , N, each symbol being composed of M elements labelled by an integer k=1, . . . M;

deriving M relative energies $p(k)$ from the corresponding elements $y_k(n)$ of the N symbols;

deriving a cost function from a function of (i) a carrier frequency offset value, (ii) the symbols $y_k(n)$; and (ii) the relative energies $p(k)$; and determining the carrier frequency offset value as a stationary point of the cost function.

An alternative expression of the second aspect of the invention is an OFDM receiver including:

a first portion for receiving OFDM signals and for generating reconstructed messages, the first portion being arranged to employ carrier frequency offset values and one or more channel parameters;

a second portion for estimating carrier frequency offset values and one or more transmission channel parameters from received OFDM signals, the second portion including:

a carrier frequency offset estimation unit arranged to receive the signals and to estimate the carrier frequency offset, and a channel parameters estimation unit;

the carrier frequency offset estimation unit being arranged to estimate the carrier offset upon receiving a training sequence of N symbols $y_k(n)$ labelled by an integer n=1, . . . , N, each symbol being composed of M elements labelled by an integer k=1, . . . M, by:

deriving M relative energies $p(k)$ from the corresponding elements $y_k(n)$ of the N symbols;

deriving a cost function from a function of (i) a carrier frequency offset value, (ii) the symbols $y_k(n)$; and (ii) the relative energies $p(k)$; and determining the carrier frequency offset value as a stationary point of the cost function.

The first and second aspects of the invention may be used independently, but more preferably are used in combination.

BRIEF DESCRIPTION OF THE FIGURES

An embodiment of the invention will now be described for the sake of example only with reference to the following figures, in which.

DETAILED DESCRIPTION OF THE EMBODIMENTS

Figure 1A:
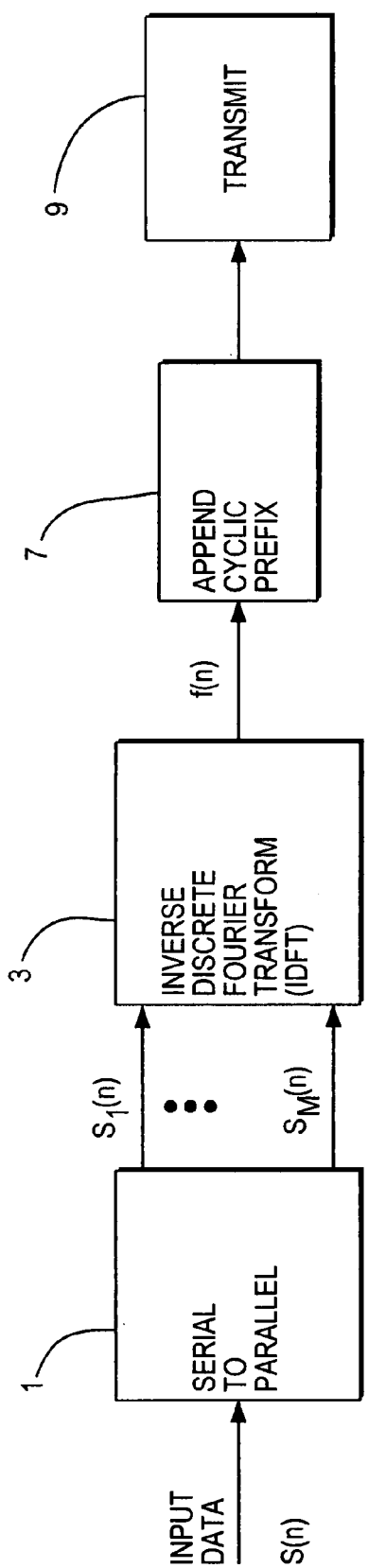
FIG. 1, which is composed of FIGS. 1(a) and 1(b), is a graphical representation of an OFDM communication system.
Figure 1B:
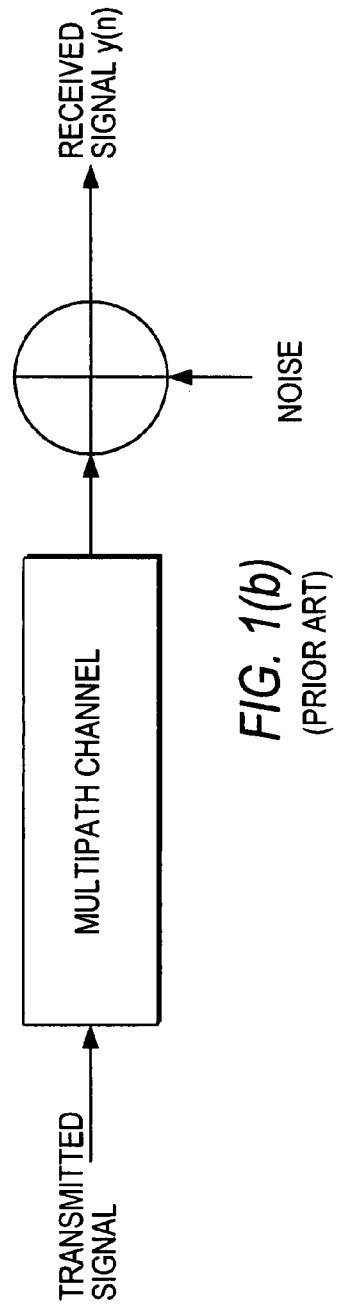
Figure 2:
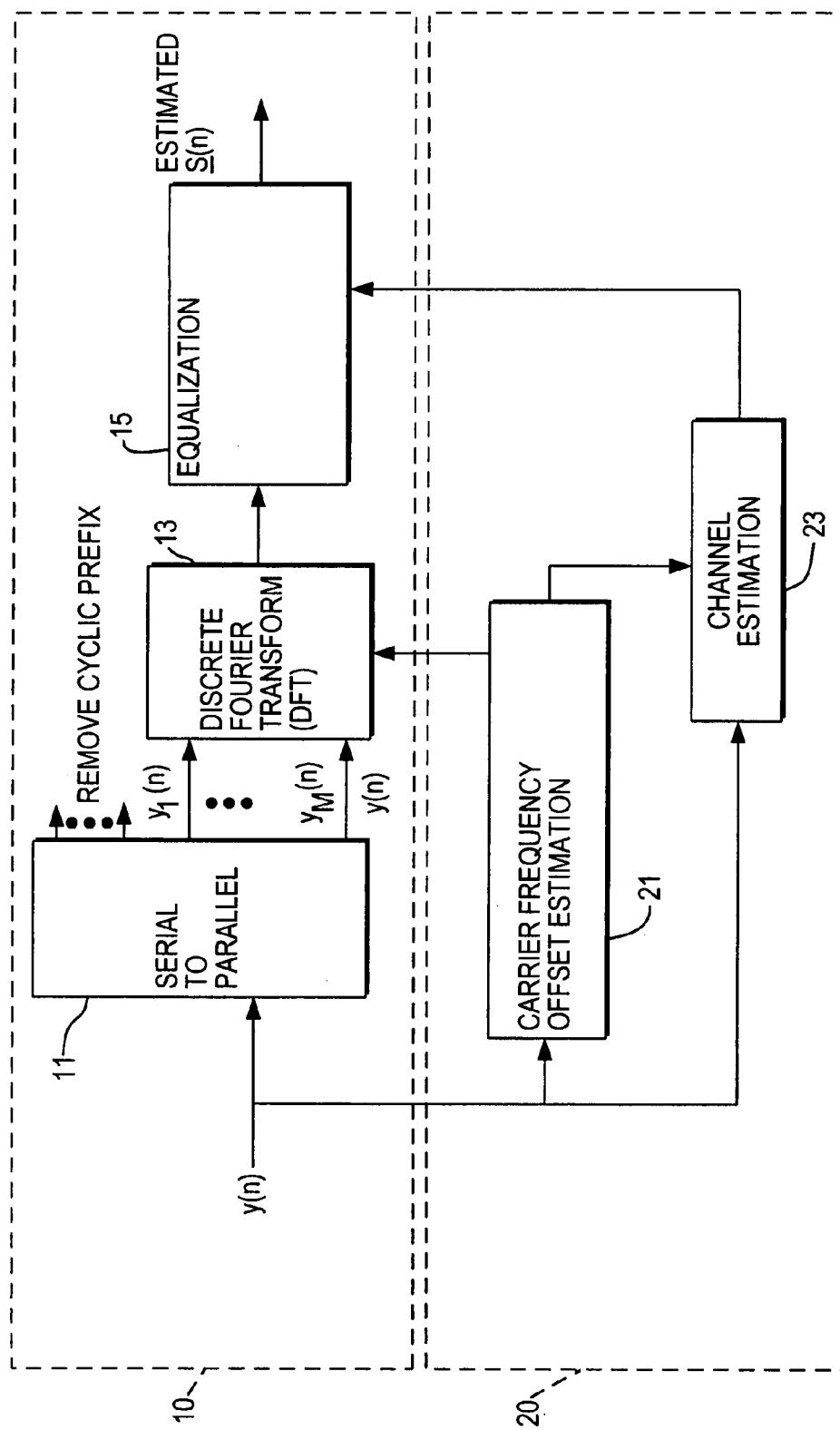
FIG. 2 shows an OFDM receiver which is an embodiment of the present invention.

The embodiment of the invention is illustrated schematically in FIG. 2. The embodiment is a receiver adapted to receive the signals generated and transmitted as described above with reference to FIG. 1. The receiver includes a portion 10 which may be identical to known systems. The portion 10 includes a serial to parallel converter 11 for removing the cyclic prefix from the received signal y(n) and generating M parallel signals y(n)=[$y_1(n), \ldots, y_M(n)$]$^T$. The portion 10 further includes a discrete Fourier transform (DFT) unit 13 which subjects the output of the converter 11 to an M-point discrete Fourier transform. The portion 10 further includes a channel equalisation unit 15 which performs equalisation of each of the M equivalent flat-fading channels output from the DFT unit 13, to generate an output S(n) which is a reconstructed form of the input to the transmitter of FIG. 1.

The embodiment further includes a portion 20 which differs from known receivers. The portion 20 includes a carrier frequency offset estimation unit 21 and a channel estimation unit 23. The output of the carrier frequency offset estimation unit 21 is transmitted both to the DFT unit 13 and to the channel estimation unit 23. The output of the channel estimation unit 23 is transmitted to the equalisation unit 15. In training period, s(n) is assumed to be known as training sequence which is a series of identical OFDM symbols.

The carrier frequency offset estimation unit 21 operates by finding a stationary point of a cost function. For certain cost functions this is a maximum of the cost function, while for other cost functions the stationary point sought is a minimum. Obviously, these two operations are equivalent in the sense that finding the maximum of a given function is equivalent to finding the minimum of that cost function multiplied by −1.

Three forms of the cost function are considered here:

1. First Form of the Cost Function

A first form of cost function utilised by the carrier frequency offset estimation unit 21 is formed as follows:

$$f_1(\phi) = \sum_{l=1}^{N} \sum_{i=1}^{N-l} \frac{\|y(i+l)e^{-jl\phi(M+N_c)} - y(i)\|^2}{\|y(i)\|^2} \quad (1)$$

In other words, as explained above in relation to the first aspect of the invenwnt, the cost function $f_1(\phi)$ is the sum, over all possible pairs of the samples (symbols), of a correlation function for a given pair given by:

$$\frac{\|y(i+l)e^{-jl\phi(N+N_c)} - y(i)\|^2}{\|y(i)\|^2} \quad (2)$$

The estimate for the carrier frequency offset is generated as $$\phi_{est} = \underset{\phi}{\arg\min}\, f_1(\phi) \quad (3)$$

Equation (1) is a sum of $C_N^2$ statistics, where $$C_N^2 = \frac{N!}{2!(N-2)!}.$$

Figure 3A:
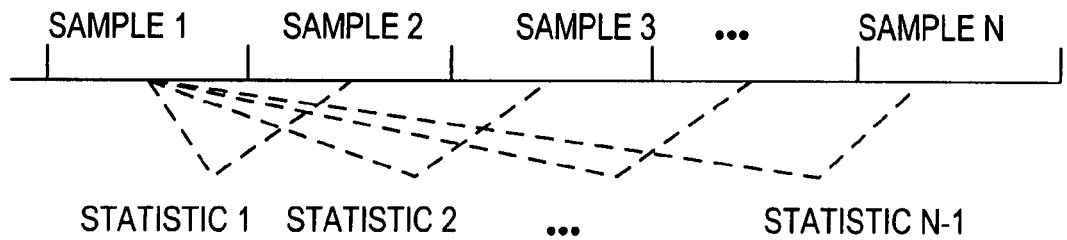
FIG. 3, which is composed of FIGS. 3(a) and 3(b), is a schematic comparison of the definition of the cost function in a prior art method and in the embodiment.
Figure 3B:
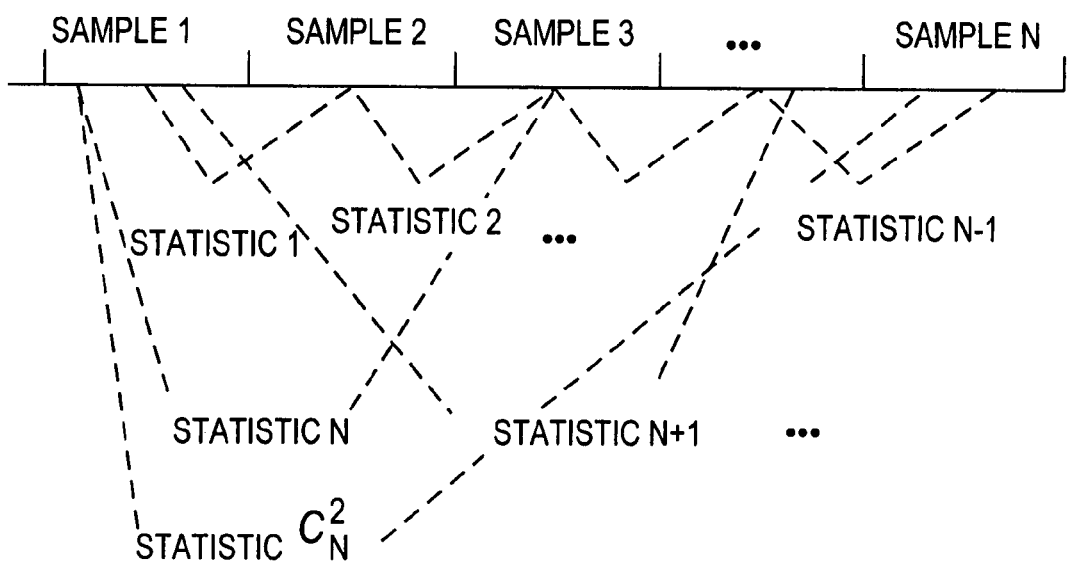

By contrast, as discussed above, the NLS estimator in [6] can only obtain a sum of N−1 statistics. This difference is illustrated in FIG. 3. FIG. 3(a) illustrates how in [6] a series of N symbols ("samples") is used to generate a cost function as a sum over the (N−1) pairs of nearest neighbours in the series. By contrast, as shown in FIG. 3(b), the embodiment generates the cost function as a sum of $C_N^2$ between all possible combinations of two samples.

Figure 4:
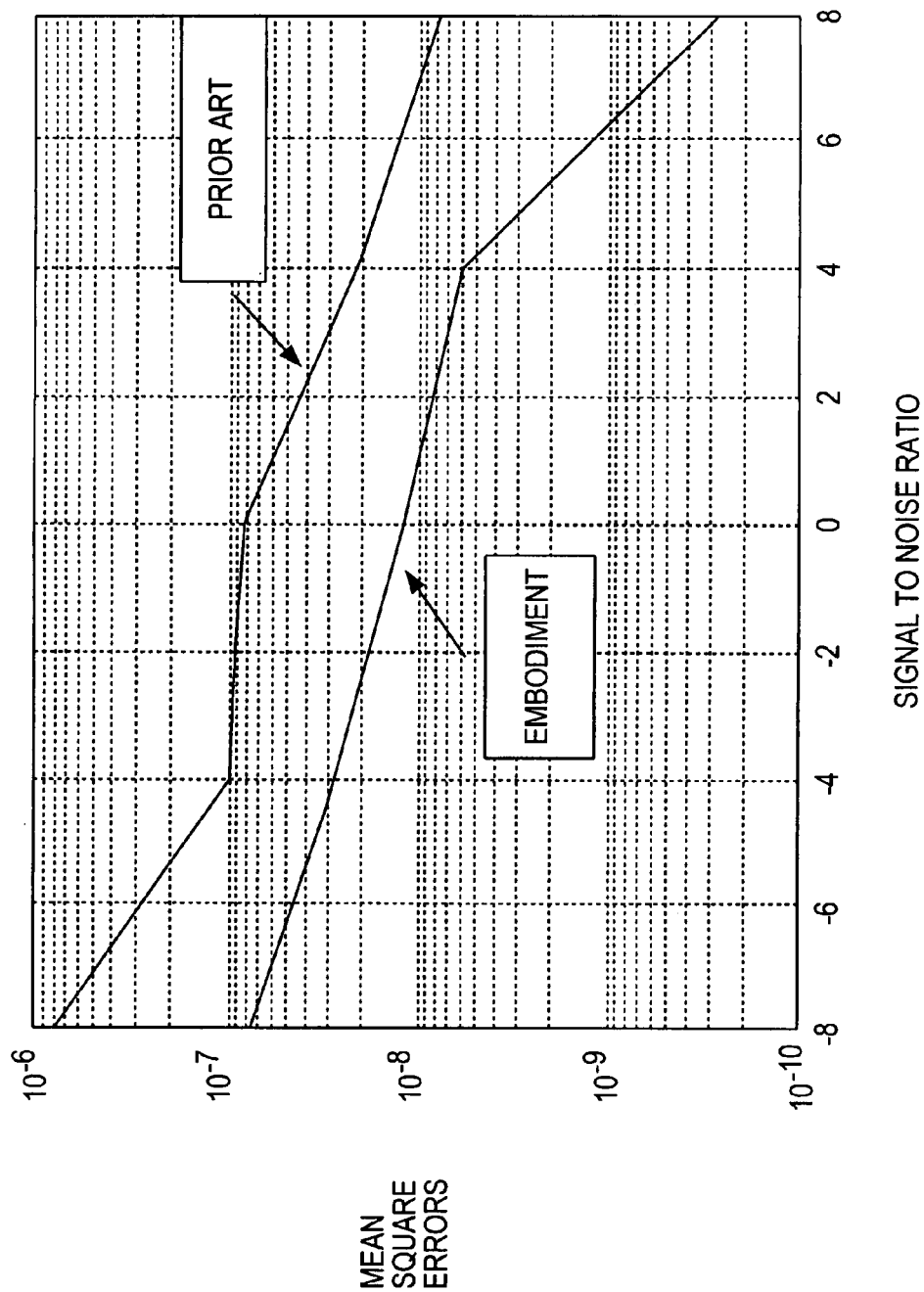
FIG. 4 is a comparison of the mean-square error performance for carrier frequency offset estimation of the prior art method and the embodiment.

Due to this difference, the proposed estimator can smooth much stronger noise and obtain more accurate carrier frequency offset estimation. This is illustrated in FIG. 4, which shows the mean square error performance of the prior art method of [6] and of the embodiment. This figure was generated as a simulation result using N=9. An improvement of roughly an order of magnitude can be seen.

Note that the method in [6] approaches the performance lower bound (Cramer-Rao bound) when the signal to noise ratio is large. However the Cramer-Rao bound (CRB) in [6] is associated with N−1 statistics. The embodiment employs many more statistics. This is the reason for the better performance achieved by the embodiment.

2. Second Form of Cost Function

The cost function $f_1(\phi)$ has the advantage discussed above that it is composed of the sum of N(N−1)/2 terms. However, it does not take into account the other concept explained above in relation to the second aspect of the invention, i.e. exploiting the differing relative energies p(k) of the elements of the symbols.

Let the relative energy vector be defined as:

$$p = \begin{bmatrix} p(1) \\ p(2) \\ \vdots \\ p(M) \end{bmatrix} = \frac{1}{N} \sum_{i=1}^{N} y(i).*conj(y(i)) \quad (4)$$

$$p = \begin{bmatrix} p(1) \\ p(2) \\ \vdots \\ p(M) \end{bmatrix} = diag\left(eig\left(\frac{1}{N} \sum_{i=1}^{N} y(i) \cdot y(i)^H\right)\right) \quad (5)$$

where eig denotes eigen-decomposition, $(.)^H$ denotes the conjugate transpose, and conj(.) denotes the conjugate.

In this case, we propose a second form of the cost function which is:

$$f_2(\phi) = \sum_{l=1}^{N} \sum_{i=1}^{N-l} \frac{\|y(i+l)e^{-jl\phi(M+N_c)} - y(i)).*p\|^2}{\|y(i)\|^2} \quad (6)$$

Function $f_2(\phi)$ is a generalised form of $f_1(\phi)$ (to which it reduces in the case that p(k) is 1 for all k) and shares the advantage of $f_1(\phi)$ that it is a sum of N(N−1) terms, but it additionally takes into account the relative energies of the elements in each OFDM symbol. In this case (3) is replaced by:

$$\phi_{est} = \underset{\phi}{\arg\min}\, f_2(\phi) \quad (7)$$

3. Third Form of the Cost Function

Note that the second aspect of the invention (employing the relative energies p(k)) is logically independent of the first aspect in the sense that the second aspect of the invention can be used in the absence of the first aspect. This possibility is used by a third form of the cost function defined as follows. Consider the vector A given by:

$$A = [0, e^{j\phi(M+N_c)}, \cdots e^{j\phi(M+N_c)(N-1)}] \quad (8)$$

In this case the third form of the cost function can be defined as:

$$f_3(\phi) = \frac{1}{N} \sum_{k=1}^{M} A^H y(k) p(k) \quad (9)$$

Note that this function is not a sum over pairs of symbols, and in this sense is simpler to implement. In this case (3) is replaced by $$\phi_{est} = \underset{\phi}{\operatorname{argmax}} f_3(\phi) \quad (10)$$

Both $f_2$ and $f_3$ take into account the relations among elements of the OFDM symbols. By contrast, the NLS estimator in [6] did not.

After carrier frequency offset estimation, the channel estimation can be achieved using carrier frequency information and the training sequence as follows:

$$H_{est} = diag\left[\frac{1}{MN} W^H \overline{E}_{est}^{-1} y e^{j(n-1)(\phi_{est}+\zeta)(M+N_c)} \cdot / \underline{s}(n)\right], \quad (4)$$

In Eqn. (4), ./ denotes that the elements in the former matrix are divided by the corresponding elements in the latter matrix, respectively. $W^H$ means the conjugate transpose of W, and $E_{est}^{-1}$ means the inverse of E.

Although the invention has been described above in relation to a single embodiment, many variations are possible within the scope of the invention as will be clear to a skilled reader. For example, although the text above refers to the receiver having various "units", the invention is not limited to receivers in which these are separate physical units. Rather they may be portions of software, which runs on any number of processors.

Moreover, although the cost functions of Eqns. (1) and (6) include terms from all of the $C_N^2$ possible pairs of samples, the invention is not limited in this respect. For example, in practical applications, only a proportion of these terms (e.g. up to a half, or up to a quarter) may be included in the expression for the cost function. Provided the number of statistics generated is significantly higher than (N-1) (for example, $N^2/4$ or at least 2N) a significant improvement in estimation can be achieved. In fact, one can flexibly choose the numbers of statistics up to $C_N^2$ according to the estimation precision required.

Embodiments of the invention make it possible to estimate the carrier frequency offset and channel parameters better than by conventional methods by a special cost function. This is achieived without a great increase in complexity. Thus, the embodiments can improve the receiving performance of the OFDM receiver in DTVB, WLAN and wireless ATM.

REFERENCES

The disclosure contained in the following references is incorporated herein in its entirety by reference:

[1] Hui Liu and Ufuk Tureli, "A High-Efficiency Carrier Estimator for OFDM Communications." IEEE Communications Letter, vol. 2, no. 4, April 1998.

[2] Ufuk Tureli, Hui Liu and Michael D. Zoltowski, "OFDM Blind Carrier Offset Estimation: ESPRIT." IEEE Transactions on Communications, vol. 48, no. 9, September 2000.

[3] Robert W. Heath. Jr and Georgios B. Giannakis, "Exploiting Input Cyclostationarity for Blind Channel Identification in OFDM Systems." IEEE Transactions on Signal Processing, vol. 47, no. 3, March 1999.

[4] Ove Edfors, Magnus Sandell, et al, "OFDM Channel Estimation by Singular Value Decomposition." IEEE Transactions on Communications, vol. 46, no. 7, July 1998.

[5] Jian Li and Renbiao Wu, "An efficient Algorithm for Time Delay Estimation." IEEE Transactions on Signal Processing, vol.46, no.8, August 1998.

[6] Jian Li, Guoqing Liu and Georgios B. Giannakis, "Carrier Frequency Offset Estimation for OFDM-Based WLANs." IEEE Signal Processing Letters, vol.8, no.3, March 2001.

What is claimed is:

1. A method, for use in an OFDM receiver, of estimating a carrier frequency offset value, the method including:
    receiving an OFDM signal including a received signal for each of a series of N symbols;
    deriving a cost function which is a sum, over a set of pairs of said symbols, of a correlation function of
    (i) a carrier frequency offset value, and
    (ii) the received signals for that pair of symbols;
    determining the carrier frequency offset value as a stationary point of the cost function;
    wherein said pairs of symbols comprise pairs of symbols which are not consecutive within said series.

2. A method according to claim 1 in which the pairs of symbols comprise substantially all possible pairs of the N symbols.

3. A method according to claim 1 in which the number of said pairs of symbols is greater than N.

4. A method according to claim 1 in which the number of pairs of symbols is at least half $$\frac{N!}{2!(N-2)!}.$$

5. A method according to claim 1 in which the N OFDM signals $y_k(n)$ labelled by an integer n=1, . . . , N are composed of M elements, the method including deriving M relative energies p(k) from the corresponding elements $y_k(n)$ of the N symbols, and the cost function including the relative energies p(k) as weighting values.

6. A method according to claim 5 in which the cost function is given by:

$$f_2(\phi) = \sum_{i=1}^{N} \sum_{i=1}^{N-l} \frac{\|y(i+l)e^{-jl\phi(M+N_c)} - y(i)\cdot * p\|^2}{\|y(i)\|^2}$$

-continued where $$p = \begin{bmatrix} p(1) \\ p(2) \\ M \\ p(M) \end{bmatrix} = \frac{1}{N}\sum_{i=1}^{N} y(i).*conj(y(i))$$

or $$p = \begin{bmatrix} p(1) \\ p(2) \\ M \\ p(M) \end{bmatrix} = diag\left(eig\left(\frac{1}{N}\sum_{i=1}^{N} y(i) \cdot y(i)^H\right)\right).$$

7. An OFDM receiver including:
a first portion for receiving OFDM signals and generating reconstructed messages, the first portion being arranged to employ carrier frequency offset values and one or more channel parameters;
a second portion for estimating carrier frequency offset values and one or more transmission channel parameters from received OFDM signals, the second portion including:
a carrier frequency offset estimation unit arranged to receive the signals and to estimate the carrier frequency offset, and
a channel parameters estimation unit;
the carrier frequency offset estimation unit being arranged to estimate the carrier offset upon receiving a training sequence of N symbols by:
deriving a cost function which is a sum, over a set of pairs of said symbols, of a correlation function of
(i) a carrier frequency offset value, and
(ii) the received signals for that pair of symbols;
determining the carrier frequency offset value as a stationary point of the cost function;
wherein said pairs of symbols comprise pairs of symbols which are not consecutive within said series.

8. A receiver according to claim 7 in which the first portion includes:
a reception unit for receiving an OFDM signal;
a serial-to-parallel converter receiving the output of the reception unit,
a discrete Fourier transform unit receiving the output of the serial-to-parallel converter and of the carrier frequency offset estimation unit; and
an equalisation unit receiving the output of the discrete Fourier transform unit and the channel parameters estimation unit.

9. A receiver according to claim 7 in which the pairs of symbols comprise substantially all possible pairs of the N symbols.

10. A receiver according to claim 7 in which the number of said pairs of symbols is greater than N.

11. A receiver according to claim 7 in which the number of pairs of symbols is at least half $$\frac{N!}{2!(N-2)!}.$$

12. A receiver according to claim 7 in which in which the N OFDM signals $y_k(n)$ labelled by an integer n=1, . . . , N are composed of M elements, a carrier frequency offset estimation unit being arranged to derive M relative energies p(k) from the N corresponding elements yk(n) of the N symbols, and the cost function including the relative energies p(k) as weighting values.

13. A receiver according to claim 12 in which the cost function is given by:

$$f_2(\phi) = \sum_{l=1}^{N}\sum_{i=1}^{N-l} \frac{\left\|y(i+l)e^{-jl\phi(M+N_c)} - y(i).*p\right\|^2}{\|y(i)\|^2}$$

where $$p = \begin{bmatrix} p(1) \\ p(2) \\ M \\ p(M) \end{bmatrix} = \frac{1}{N}\sum_{i=1}^{N} y(i).*conj(y(i))$$

or $$p = \begin{bmatrix} p(1) \\ p(2) \\ M \\ p(M) \end{bmatrix} = diag\left(eig\left(\frac{1}{N}\sum_{i=1}^{N} y(i) \cdot y(i)^H\right)\right).$$

14. A method, for use in an OFDM receiver, of estimating a carrier frequency offset value, the method including:
receiving an OFDM signal yk(n) composed of N symbols labelled by an integer n=1, . . . , N, each symbol being composed of M elements labelled by an integer k=1, . . . M;
deriving M relative energies p(k) from the corresponding elements yk(n) of the N symbols;
deriving a cost function from a function of
(i) a carrier frequency offset value,
(ii) the symbols yk(n); and
(ii) the relative energies p(k); and
determining the carrier frequency offset value as a stationary point of the cost function.

15. A method according to claim 14 in which the cost function is given by $$f_2(\phi) = \sum_{l=1}^{N}\sum_{i=1}^{N-l} \frac{\left\|y(i+l)e^{-jl\phi(M+N_c)} - y(i).*p\right\|^2}{\|y(i)\|^2}$$

or $$f_3(\phi) = \frac{1}{N}\sum_{k=1}^{M} A^H y(k)p(k)$$

where the vector A is given by $$A=[0,\ e^{j\phi(M+N_c)},\ \Lambda e^{j\phi(M+N_c)(N-1)}]$$

and p is given by:

$$p = \begin{bmatrix} p(1) \\ p(2) \\ M \\ p(M) \end{bmatrix} = \frac{1}{N}\sum_{i=1}^{N} y(i).*conj(y(i))$$

or

-continued $$p = \begin{bmatrix} p(1) \\ p(2) \\ M \\ p(M) \end{bmatrix} = diag\left(eig\left(\frac{1}{N}\sum_{i=1}^{N} y(i) \cdot y(i)^H\right)\right)$$

where eig denotes eigen-decomposition, $(\bullet)^H$ denotes the conjugate transpose, and conj(.) denotes the conjugate.

16. An OFDM receiver including:
a first portion for receiving OFDM signals and for generating reconstructed messages, the first portion being arranged to employ carrier frequency offset values and one or more channel parameters;
a second portion for estimating carrier frequency offset values and one or more transmission channel parameters from received OFDM signals, the second portion including:
a carrier frequency offset estimation unit arranged to receive the signals and to estimate the carrier frequency offset, and
a channel parameters estimation unit;
the carrier frequency offset estimation unit being arranged to estimate the carrier offset upon receiving a training sequence of N symbols $y_k(n)$ labelled by an integer n=1, . . . , N, each symbol being composed of M elements labelled by an integer k=1, . . . M, by:
deriving M relative energies p(k) from the corresponding elements $y_k(n)$ of the N symbols;
deriving a cost function from a function of
(i) a carrier frequency offset value,
(ii) the symbols $y_k(n)$; and
(ii) the relative energies p(k); and
determining the carrier frequency offset value as a stationary point of the cost function.

17. An OFDM receiver according to claim 16 in which the cost function is given by:

$$f_2(\phi) = \sum_{l=1}^{N} \sum_{i=1}^{N-l} \frac{\left\|y(i+l)e^{-jl\phi(M+N_c)} - y(i)).*p\right\|^2}{\|y(i)\|^2}$$

or $$f_3(\phi) = \frac{1}{N}\sum_{k=1}^{M} A^H y(k) p(k)$$

where the vector A is given by $$A=[0, e^{j\phi(M+N_c)}, \Lambda e^{j\phi(M+N_c)(N-1)}]$$

and p is given by:

$$p = \begin{bmatrix} p(1) \\ p(2) \\ M \\ p(M) \end{bmatrix} = \frac{1}{N}\sum_{i=1}^{N} y(i).*conj(y(i))$$

or $$p = \begin{bmatrix} p(1) \\ p(2) \\ M \\ p(M) \end{bmatrix} = diag\left(eig\left(\frac{1}{N}\sum_{i=1}^{N} y(i) \cdot y(i)^H\right)\right)$$

where eig denotes eigen-decomposition, $(\bullet)^H$ denotes the conjugate transpose, and conj(.) denotes the conjugate.

18. An OFDM signal communication system including an ODFM signal transmission unit and a receiver according to claim 7.

19. An OFDM signal communication system including an OFDM signal transmission unit and a receiver according to claim 16.

* * * * *